(12) United States Patent
Yamamoto

(10) Patent No.: US 9,191,078 B2
(45) Date of Patent: Nov. 17, 2015

(54) COMMUNICATION DEVICE AND COMMUNICATION METHOD

(75) Inventor: Naotake Yamamoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 533 days.

(21) Appl. No.: 13/700,143

(22) PCT Filed: Apr. 16, 2012

(86) PCT No.: PCT/JP2012/002624
§ 371 (c)(1),
(2), (4) Date: Nov. 27, 2012

(87) PCT Pub. No.: WO2012/169105
PCT Pub. Date: Dec. 13, 2012

(65) Prior Publication Data
US 2013/0188674 A1 Jul. 25, 2013

(30) Foreign Application Priority Data
Jun. 8, 2011 (JP) .................................. 2011-128705

(51) Int. Cl.
*H04B 7/005* (2006.01)
*H01Q 3/20* (2006.01)
*H01Q 15/14* (2006.01)

(52) U.S. Cl.
CPC ............... *H04B 7/005* (2013.01); *H01Q 3/20* (2013.01); *H01Q 15/14* (2013.01)

(58) Field of Classification Search
CPC ........ H04B 7/0413; H04Q 9/00; G04C 10/04; G08C 15/04
USPC ......... 455/500; 340/1.1–16.1, 870.11–870.15
See application file for complete search history.

(56) References Cited

U.S. PATENT DOCUMENTS

| | | | | |
|---|---|---|---|---|
| 5,697,063 A | * | 12/1997 | Kishigami et al. | 455/507 |
| 7,280,184 B2 | * | 10/2007 | Hasegawa et al. | 355/53 |
| 7,330,736 B2 | * | 2/2008 | Redi | 455/553.1 |
| 7,464,213 B2 | * | 12/2008 | Fukuda | 710/301 |
| 7,536,095 B2 | * | 5/2009 | Suto et al. | 396/90 |
| 7,546,030 B2 | * | 6/2009 | Ito et al. | 396/79 |

(Continued)

FOREIGN PATENT DOCUMENTS

| | | |
|---|---|---|
| JP | 07-250024 | 9/1995 |
| JP | 9-135109 | 5/1997 |

(Continued)

OTHER PUBLICATIONS

International Search Report issued May 22, 2012 in International (PCT) Application No. PCT/JP2012/002624.

(Continued)

*Primary Examiner* — Hai V Nguyen

(74) *Attorney, Agent, or Firm* — Wenderoth, Lind & Ponack, L.L.P.

(57) ABSTRACT

A communication device includes: an antenna unit through which electric waves are transmitted and received; a scatterer which reflects the electric waves; a communication unit configured to wirelessly communicate with a first communication partner device via the antenna unit; and a scatterer control unit configured to change a state of the scatterer when communication fails between the communication unit and the first communication partner device.

15 Claims, 15 Drawing Sheets

(56) References Cited

U.S. PATENT DOCUMENTS

| | | | |
|---|---|---|---|
| 7,593,053 B2* | 9/2009 | Ito et al. | 348/348 |
| 7,970,426 B2* | 6/2011 | Poe et al. | 455/519 |
| 8,116,710 B2* | 2/2012 | Dent et al. | 455/226.1 |
| 8,149,178 B2* | 4/2012 | Alamouti et al. | 343/837 |
| 8,320,942 B2* | 11/2012 | Sadri et al. | 455/466 |
| 8,412,130 B2* | 4/2013 | Suematsu et al. | 455/106 |
| 8,576,052 B2* | 11/2013 | Sano | 340/10.51 |
| 8,797,211 B2* | 8/2014 | Valdes-Garcia | 342/367 |
| 2006/0083261 A1* | 4/2006 | Maeda et al. | 370/465 |
| 2006/0149855 A1* | 7/2006 | Fukuda | 710/2 |
| 2006/0232698 A1* | 10/2006 | Ito et al. | 348/345 |
| 2006/0232699 A1* | 10/2006 | Suto et al. | 348/345 |
| 2006/0232701 A1* | 10/2006 | Ito et al. | 348/348 |
| 2007/0156864 A1* | 7/2007 | McCoy et al. | 709/222 |
| 2007/0293232 A1* | 12/2007 | Nonaka | 455/450 |
| 2008/0298690 A1* | 12/2008 | Oh et al. | 382/224 |
| 2009/0015408 A1* | 1/2009 | Asai et al. | 340/572.1 |
| 2009/0034683 A1* | 2/2009 | Tamakoshi | 378/91 |
| 2010/0128111 A1* | 5/2010 | Pommerenke et al. | 348/50 |
| 2010/0311350 A1* | 12/2010 | Dent et al. | 455/67.13 |
| 2011/0063092 A1* | 3/2011 | Sano | 340/10.51 |
| 2012/0038537 A1 | 2/2012 | Yamamoto et al. | |
| 2013/0188674 A1* | 7/2013 | Yamamoto | 375/219 |
| 2013/0229603 A1* | 9/2013 | Tamaki et al. | 349/113 |

FOREIGN PATENT DOCUMENTS

| | | |
|---|---|---|
| JP | 09-186644 | 7/1997 |
| JP | 10-303631 | 11/1998 |
| JP | 11-298969 | 10/1999 |
| JP | 2001-274733 | 10/2001 |
| JP | 2002-345027 | 11/2002 |
| WO | 2011/105019 | 9/2011 |
| WO | WO 2011123300 A1 * | 10/2011 |

OTHER PUBLICATIONS

Christopher L. Holloway et al., "On the Use of Reverberation Chambers to Simulate a Rician Radio Environment for the Testing of Wireless Devices", IEEE Transactions on Antennas and Propagation, vol. 54, No. 11, Nov. 2006.

Paul Hallbjorner, "Reverberation Chamber with Variable Received Signal Amplitude Distribution", Microwave and Optical Technology Letters, vol. 35, No. 5, Dec. 5, 2002.

* cited by examiner

Priority table of slave station A

| Slave station | Reception intensity | Priority |
|---|---|---|
| A | — | 1 |
| B | -65dB | 2 |
| C | -75dB | 3 |

FIG. 10

Priority table of slave station A    218a

| Slave station | State of scatterer | Reception intensity | Priority |
|---|---|---|---|
| A | First state | — | 1 |
| B | First state | -65dB | 2 |
| C | Second state | -75dB | 3 |

FIG. 12

Priority table of master station                    218b

| Slave station | Reception intensity | Priority |
|---|---|---|
| A | -65dB | 1 |
| B | -70dB | 2 |
| C | -75dB | 3 |

COMMUNICATION DEVICE AND COMMUNICATION METHOD

TECHNICAL FIELD

The present invention relates to communication devices and communication methods for wireless communication.

BACKGROUND ART

In recent years, a system has been developed for exchanging information among devices, such as home electric appliances in a home, by connecting these devices via a wireless network. In such a system, for example, a control device and a plurality of electric apparatuses which are communication devices are installed in a home. A wireless network is configured through which these communication devices are connected according to a star topology having the control apparatus at the center. Examples of these communication devices include, for example, a TV, an air conditioner, a refrigerator, a washing machine, and a mobile phone.

In such a configuration, depending on an installation status of a communication device, reception intensity of electric waves from other communication devices (communication partner devices) decreases significantly to the point of being null due to multipath propagation in some cases.

Even when the reception intensity of the electric waves decreases to the point of being null, if the communication device is a portable apparatus (movable object) such as a mobile phone, propagation of the electric waves changes as the communication device moves. Thus, the communication device can recover from null of the reception intensity of electric waves, whereby communication succeeds with a communication partner device.

Furthermore, a technique is disclosed which allows two communication devices to communicate with each other even when the communication devices are being moved, by controlling the direction of directional antennas in accordance with a position relationship between the two communication devices (see Patent Literature (PTL) 1, for example).

CITATION LIST

Patent Literature

[PTL 1] Japanese Unexamined Patent Application Publication No. H09-186644

SUMMARY OF INVENTION

Technical Problem

However, if the communication device is not a portable apparatus such as a mobile phone but an apparatus which is usually used while fixed to a given place, such as a TV, a refrigerator, and a washing machine, the reception intensity of the communication device remains null after the reception intensity of electric waves from the communication partner device decreases to the point of being null, since the communication device is not moved.

As a result, the communication device cannot communicate with the communication partner device, nor obtain the position of the communication partner device. Accordingly, there has been a problem that the communication device and a communication partner device cannot communicate after the reception intensity of electric waves from a communication partner device decreases to the point of being null, which means communication with the communication partner device fails permanently.

The present invention has been conceived in view of the above problem, and has an object to provide a communication device and a communication method in which, even when communication fails between a communication device and a communication partner device due to decrease in the reception intensity of electric waves to the point of being null, communication with the communication partner device succeeds without moving the communication device.

Solution to Problem

In order to achieve the above object, a communication device according to an aspect of the present invention includes: an antenna unit through which electric waves are transmitted and received; a scatterer which reflects the electric waves; a communication unit configured to wirelessly communicate with a first communication partner device via the antenna unit; and a scatterer control unit configured to change a state of the scatterer when communication fails between the communication unit and the first communication partner device.

These general and specific aspects may be implemented using a system, a method, an integrated circuit, a computer program, or a recording medium, or any combination of systems, methods, integrated circuits, computer programs, or recording media.

Advantageous Effects of Invention

With the present invention, even when communication fails between a communication device and a communication partner device due to decrease in reception intensity of electric waves to the point of being null, it is possible to make communication successful without moving the communication device.

BRIEF DESCRIPTION OF DRAWINGS

FIG. 10 shows an example of a priority table according to Modification 1 of Embodiment 2.

FIG. 12 shows an example of a priority table according to Embodiment 3.

DESCRIPTION OF EMBODIMENTS

Figure 1:
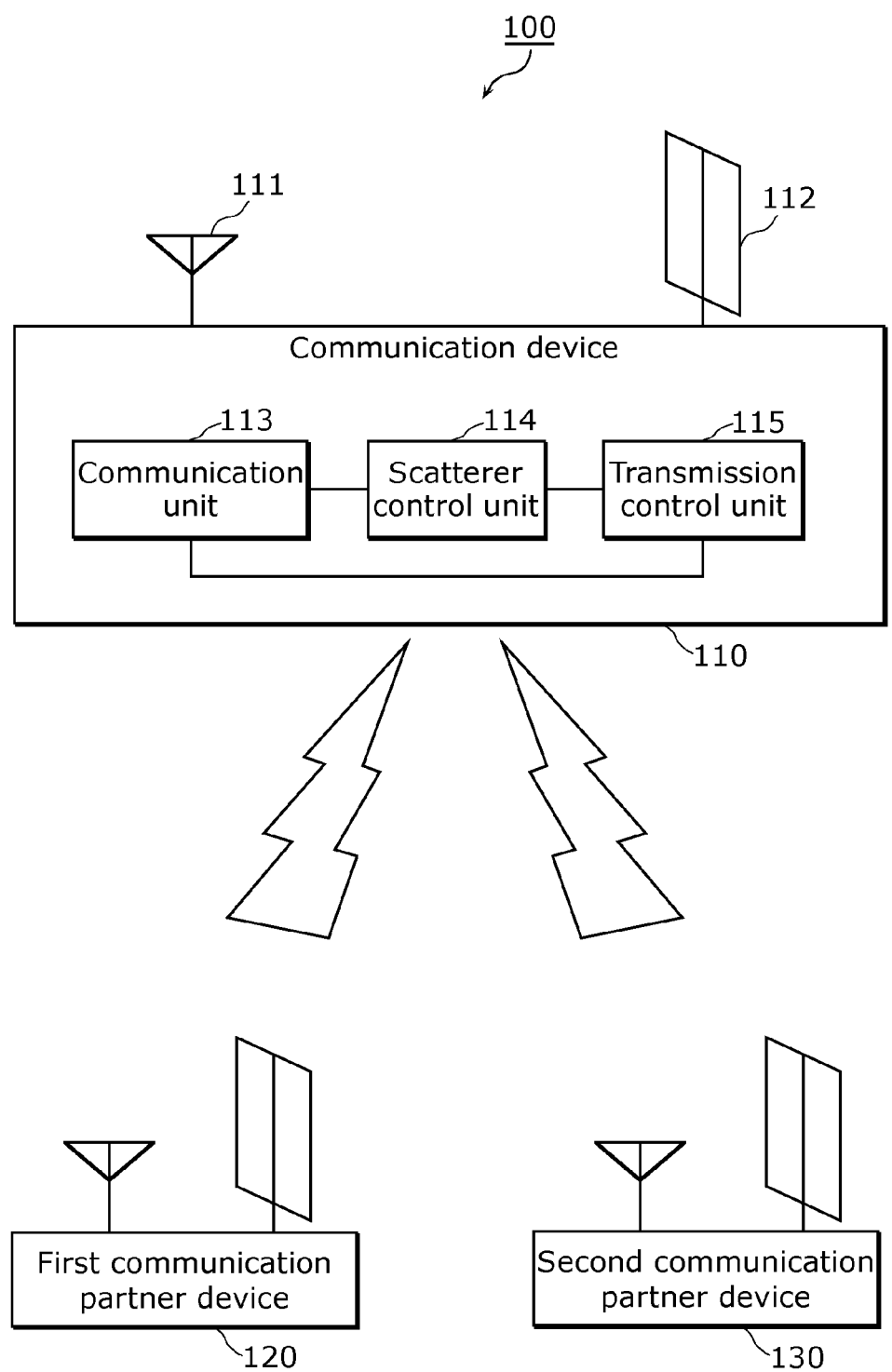
FIG. 1 is a block diagram showing a configuration of a communication system according to Embodiment 1.

A communication device according to an aspect of the present invention includes: an antenna unit through which electric waves are transmitted and received; a scatterer which reflects the electric waves; a communication unit configured to wirelessly communicate with a first communication partner device via the antenna unit; and a scatterer control unit configured to change a state of the scatterer when communication fails between the communication unit and the first communication partner device.

With this configuration, when communication fails between the communication unit and the first communication partner device, communication succeeds with the first communication partner device by changing the state of the scatterer of the communication device. That is, even when communication fails between a communication device and a communication partner device due to decrease in reception intensity of electric waves to the point of being null, it is possible to make communication successful without moving the communication device by changing the state of the scatterer of the communication device.

For example, the communication device may further include a transmission control unit configured to, when communication fails between the communication unit and the first communication partner device even after changing the state of the scatterer by the scatterer control unit, cause the communication unit to transmit, to a second communication partner device, a control request for changing a state of a scatterer of the second communication partner device.

With this configuration, when communication fails between the communication unit and the first communication partner device, the communication device first changes the state of the scatterer of the communication device in trying to make communication successful with the first communication partner device. In other words, the communication device changes the propagation state of the electric waves by changing the angle or direction of the scatterer of the communication device, in trying to make communication successful with the first communication partner device.

When communication fails between the communication unit and the first communication partner device even after changing the state of the scatterer of the communication device, the communication device transmits, to the second communication partner device, the control request for changing the state of the scatterer of the second communication partner device. The second communication partner device is different from the first communication partner device.

Thus, the state of the scatterer of the second communication partner device is changed and the propagation state of the electric waves is changed, whereby it is possible to make the communication device recover from null without moving the communication device. As a result, it is possible to make communication successful with the first communication partner device without moving the communication device.

For example, when the second communication partner device includes two or more second communication partner devices, the communication unit may transmit a predetermined request packet to each of the second communication partner devices, the communication device may further include: a measurement unit configured to measure reception intensity of a response packet transmitted from each of the second communication partner devices upon reception of the predetermined request packet; and a determination unit configured to determine a priority level of each of the second communication partner devices, the priority level increasing as the reception intensity of the response packet increasing, and when communication fails between the communication unit and the first communication partner device even after changing the state of the scatterer, the transmission control unit may cause the communication unit to transmit the control request to the second communication partner device in order of the priority level determined by the determination unit.

With this configuration, when the second communication partner device includes two or more second communication partner devices, the priority levels of the second communication partner devices can be determined so that the priority level increases as the reception intensity of the response packet increases. In other words, the control request can be preferentially transmitted to the second communication partner device which has a large influence on the propagation state of the electric waves near the communication device. Accordingly, it is possible to make communication successful with the first communication partner device more efficiently than by changing the state of the scatterer of the second communication partner devices at random.

For example, the determination unit may determine the priority level of each of the second communication partner devices prior to communicating with the first communication partner device, the communication device may further include a storage unit configured to store a priority table in which the priority level determined by the determination unit is recorded, and when communication fails between the communication unit and the first communication partner device even after changing the state of the scatterer, the transmission control unit may cause the communication unit to transmit the control request to the second communication partner device in order of the priority level recorded in the priority table.

With this configuration, the transmission control unit can transmit the control request to the second communication partner device according to a preliminarily determined priority level. That is, it is not required to determine the priority level by transmitting the request packet to the second communication partner devices every time communication fails with the first communication partner device. Accordingly, when communication fails with the first communication partner device, the communication device can transmit a control request to the second communication partner device in a shorter time period. As a result, it is possible to recover from a state in which communication fails with the first communication partner device.

For example, the measurement unit may measure the reception intensity in response to the change in (i) the state of the scatterer of the communication device or (ii) the state of the scatterer of the second communication partner device, and the determination unit may update the priority levels of the second communication partner devices recorded in the priority table, according to the measured reception intensity.

With this configuration, it is possible to measure the reception intensity and update the priority level according to the change in the state of the scatterer. Accordingly, it is possible to transmit a control request to the second communication partner device according to the current reception intensity.

That is, it is possible to preferentially transmit the control request to a second communication partner device which has a large influence on the propagation state of the electric waves near the communication device in the current state of the scatterer. As a result, it is possible to make communication successful with the first communication partner device more efficiently.

For example, (i) the state of the scatterer of the communication device and (ii) the state of the scatterer of each of the second communication partner devices may be further recorded in the priority table, when communication fails between the communication unit and the first communication partner device, the scatterer control unit may change the state of the scatterer into the state recorded in the priority table, and when communication fails between the communication unit and the first communication partner device even after changing the state of the scatterer by the scatterer control unit, the transmission control unit may cause the communication unit to transmit, to the second communication partner device, a control request for changing a state of a scatterer of the second communication partner device into the state recorded in the priority table.

With this configuration, the state of the scatterer of the communication device and the state of the second communication partner device can be changed to the state of the scatterer recorded in the priority table. Accordingly, by recording a state of the scatterer obtained when communication succeeds with the first communication partner device into the priority table, it is possible to make communication with the first communication partner device successful promptly.

For example, the communication unit may receive, from each of the second communication partner devices, information indicating transmission power used by the second communication partner device in transmitting the response packet, and the measurement unit may correct the reception intensity of the response packet according to the transmission power indicated by the received information.

The reception intensity of the response packet depends on the magnitude of the transmission power used when the response packet is transmitted. However, the magnitude of the transmission power has small influence on the propagation state of the electric waves near the communication device. Accordingly, it is preferable that the influence of the transmission power is lowered when the priority level is determined according to the reception intensity of the response packet.

Therefore, the reception intensity of the response packet is corrected according to the transmission power used when each of the second communication partner devices transmits the response packet. This lowers the influence of the transmission power on determination of the priority level. Therefore, it is possible to determine the priority level so that a priority level of a second communication partner device increases as the influence of the second communication partner device on the propagation state of the electric waves near the communication device increases.

For example, the communication device may further include a notification unit configured to, when communication fails between the communication unit and the first communication partner device even after transmitting the control request to all of the second communication partner devices, notify a user of information indicating that communication fails between the communication unit and the first communication partner device.

With this configuration, it is possible to notify the user that communication fails with the first communication partner device even after changing the state of the scatterer of the communication device and the second communication partner device. Accordingly, it is possible for the user to make the communication device recover from a state in which communication fails with the first communication partner device, by changing the installment position of the communication device, for example.

For example, the communication device may be a non-portable electric apparatus.

With this configuration, the communication device is a non-portable electric apparatus. In other words, the communication device may be an electric apparatus which is usually used with fixed at a predetermined place, such as a TV, a refrigerator, a washing machine, or an air conditioner, for example.

For example, the communication unit may determine that communication fails between the communication unit and the first communication partner device, (i) when a response is not received from the first communication partner device for a certain period of time after transmitting data to the first communication partner device or (ii) when the reception intensity obtained when receiving data from the first communication partner device is equal to or smaller than a predetermined threshold.

With this configuration, it is possible to determine more accurately that communication fails with the first communication partner device.

For example, the scatterer may be a louver of an air conditioner, a louver of an air cleaner, or a fan blade.

With this configuration, it is possible to reduce the number of components of the communication device by using a member for implementing a function of the communication device as the scatterer.

For example, the first communication partner device may be a master station which controls slave stations via a communication network, and the communication device and the second communication partner device may be the slave stations.

With this configuration, one of the slave stations, which is registered as a slave station to be controlled in the master station which controls the slave stations via the communication network, can be set as the communication device, and the master station can be set as the first communication partner device. That is, when communication fails between the one of the slave stations and the master station, the one of the slave stations changes a state of a scatterer of one of the rest of the slave stations so that it is possible to make communication successful between the one of the slave stations and the master station.

For example, the communication device may be a master station which controls slave stations via a communication network, and the first communication partner device and the second communication partner device may be the slave stations.

With this configuration, a master station which controls the slave stations via the communication network can be set as the communication device, and the slave stations can be set as the communication partner devices. That is, when communication fails between the master station and one of the slave stations, the master station changes the state of one of the rest of the slave stations so that it is possible to make communication successful between the master station and the one of the slave stations.

It is to be noted that a general or specific aspects of the above may be realized by a system, a method, an integrated circuit, a computer program, or a recording medium, and an arbitrary combination of a system, a method, an integrated circuit, a computer program, or a recording medium.

For example, the communication device may further include a notification unit configured to, when communication fails between the communication unit and the first communication partner device even after changing the state of the scatterer by the scatterer control unit, notify a user of information indicating that communication fails between the communication unit and the first communication partner device.

With this configuration, it is possible to notify the user that communication fails with the first communication partner device even after changing the state of the scatterer of the communication device. Accordingly, it is possible for the user to make the communication device recover from a state in which communication fails with the first communication partner device, by changing the installment position of the communication device, for example.

An embodiment of the present invention is described below with reference to drawings.

It is to be noted that each of the embodiments described below is a specific example of the present invention. Numeric values, shapes, materials, constituents, positions and topologies of the constituents, steps, an order of the steps, and the like in the following embodiments are an example of the present invention, and it should therefore not be construed that the present invention is limited by these embodiments. Furthermore, out of the constituents in the following embodiments, the constituents not stated in the independent claims describing the broadest concept of the present invention are described as optional constituents.

[Embodiment 1]

FIG. 1 is a block diagram showing a configuration of a communication system 100 according to Embodiment 1. The communication system 100 includes a communication device and a plurality of communication partner devices. In the present embodiment, the communication system 100 includes a communication device 110, a first communication partner device 120, and a second communication partner device 130.

It is to be noted that in the present embodiment, illustration and description on the configuration of the first communication partner device 120 and the second communication partner device 130 is omitted, since the configurations are similar to those of the communication device 110.

The communication device 110 wirelessly communicates with the first communication partner device 120 and the second communication partner device 130 using electric waves. For wireless communication, a wireless personal area network (PAN) or a wireless local are network (LAN) are used, for example.

As shown in FIG. 1, the communication device 110 includes an antenna unit 111, a scatterer 112, a communication unit 113, a scatterer control unit 114, and a transmission control unit 115.

The antenna unit 111 transmits and receives electric waves. That is, the antenna unit 111 transmits and receives electric waves in a band used for wireless communication (hereinafter refereed to as "communication band").

Figure 2:
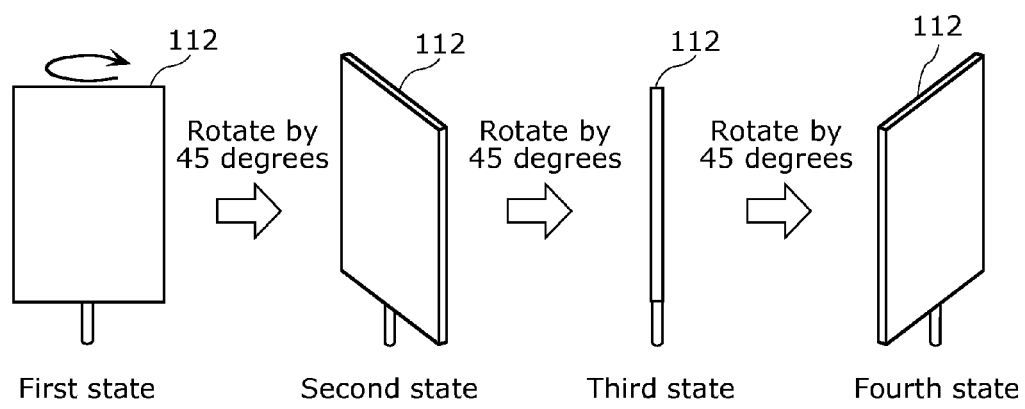
FIG. 2 shows an example of a scatterer according to Embodiment 1.

The scatterer 112 reflects the electric waves. That is, the scatterer 112 is a member which reflects the electric waves in the communication band. The scatterer 112 is a metal board member as shown in FIG. 2 and is rotated by a driving unit such as a motor, for example.

The communication unit 113 wirelessly communicates with each of the first communication partner device 120 and the second communication partner device 130, via the antenna unit 111. That is, by causing the antenna unit 111 to emit electric waves in the communication band, the communication unit 113 wirelessly communicates with each of the first communication partner device 120 and the second communication partner device 130.

The scatterer control unit 114 changes the state of the scatterer 112, when communication fails between the communication unit 113 and the first communication partner device 120. For example, as shown in FIG. 2, the scatterer control unit 114 changes the state of the scatterer 112 by controlling the driving unit to rotate the scatterer 112 by 45 degrees clockwise.

It is to be noted that the state of the scatterer 112 indicates the state of the scatterer which has an influence on reflection of the electric waves in the communication band. Specifically, the state of the scatterer 112 is an orientation, position, form, or rotational speed of the scatterer 112.

FIG. 2 shows an example of a scatterer 112 according to Embodiment 1. A first state, a second state, a third state, and a fourth state each indicates a state in which an angle of the scatterer 112 in a rectangle board is different from one another by 45 degrees. As the state of the scatterer 112 which reflects the electric waves in the communication band changes in this manner, the propagation state of the electric waves also changes. As a result, the communication state of the communication device 110 and the first communication partner device 120 also changes.

It is to be noted that the communication unit 113 may determine that communication fails between the communication unit 113 and the first communication partner device 120, (i) when a response is not received from the first communication partner device 120 for a certain period of time after transmitting data to the first communication partner device 120 or (ii) when the reception intensity obtained when receiving data from the first communication partner device 120 is equal to or smaller than a predetermined threshold. It is sufficient that, for example, a minimum value of the reception intensity at which data can be received stably is used as the predetermined threshold.

When communication fails between the communication unit 113 and the first communication partner device 120 even after changing the state of the scatterer 112 by the scatterer control unit 114, the transmission control unit 115 causes the communication unit 113 to transmit, to the second communication partner device 130, a control request for changing a state of the scatterer of the second communication partner device 130. As a result, the second communication partner device 130 changes the state of the scatterer of the second communication partner device 130 according to the control request.

Figure 3:
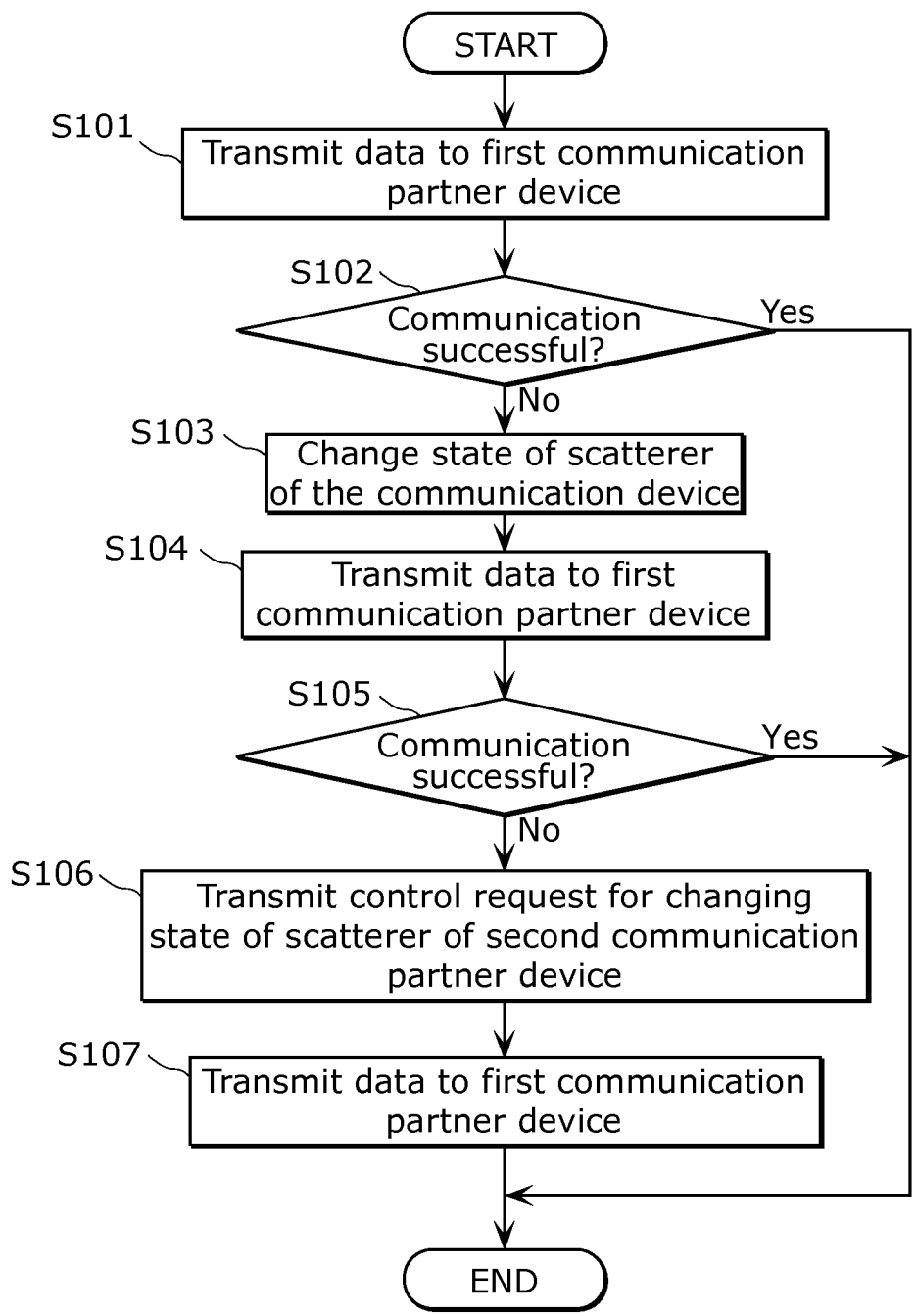
FIG. 3 is a flowchart showing a processing operation performed by a communication device according to Embodiment 1.

Next, various operations of the communication device 110 as configured above are described. FIG. 3 is a flowchart showing a processing operation performed by the communication device 110 according to Embodiment 1.

First, the communication unit 113 transmits data to the first communication partner device 120 (S101). Next, the communication unit 133 determines whether or not communication succeeds with the first communication partner device 120 (S102). Specifically, the communication unit 113 determines whether or not communication succeeds with the first communication partner device 120 based on (i) whether or not a response to the data transmitted in S101 is received from the first communication partner device 120 or (ii) the reception intensity obtained when a response is received from the first communication partner device 120.

Here, when communication succeeds between the communication unit 113 and the first communication partner device 120 (Yes in S102), the processing is completed. Meanwhile, when communication fails between the communication unit 113 and the first communication partner device 120 (No in S102), the scatterer control unit 114 changes the state of the scatterer 112 (S103).

Next, the communication unit 113 transmits data to the first communication partner device 120 (S104). Then, the communication unit 113 determines whether or not communication succeeds with the first communication partner device 120 (S105). Here, when communication succeeds between the communication unit 113 and the first communication partner device 120 (Yes in S105), the processing is completed.

Meanwhile, when communication fails with the first communication partner device 120 even after changing the state of the scatterer 112 (No in S105), the communication unit 113 transmits to the second communication partner device 130 a control request for changing the state of the scatterer of the second communication partner device 130 (S106). Then, the communication unit 113 transmits data to the first communication partner device 120 (S107), and completes the processing.

As described above, with the communication device 110 according to the present embodiment, when communication fails with the first communication partner device 120, the communication device 110 first changes the state of the scatterer 112 of the communication device 110 in trying to make communication successful again with the first communication partner device 120. In other words, the communication device 110 changes the propagation state of the electric waves by changing the angle or direction of the scatterer 112 of the communication device 110, in trying to make communication successful with the first communication partner device 120.

Then, when communication fails between the communication unit 113 and the first communication partner device 120 even after changing the state of the scatterer of the communication device 110, the communication device 110 transmits, to the second communication partner device 130, the control request for changing the state of the scatterer of the second communication partner device 130. The second communication partner device 130 is different from the first communication partner device 120.

Thus, the state of the scatterer of the second communication partner device 130 is changed and the propagation state of the electric waves is changed, whereby it is possible to make the communication device recover from null without moving each of the communication devices. As a result, it is possible to make communication successful between the communication device 110 and the first communication partner device 120 without moving each of the communication devices.

[Embodiment 2]

Next, description on Embodiment 2 is provided. In the present embodiment, the communication system according to Embodiment 1 is applied to a system for controlling a plurality of apparatuses which supply or consume electric power.

Figure 4:
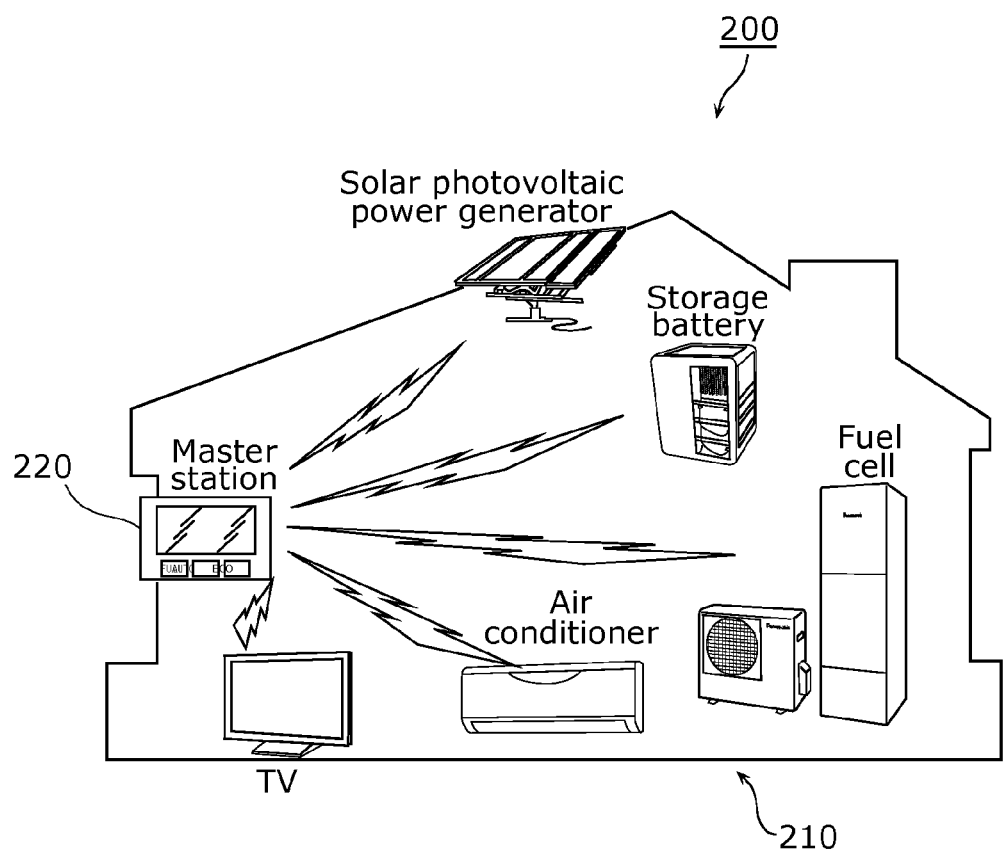
FIG. 4 shows an outline of a communication system according to Embodiment 2.
Figure 5:
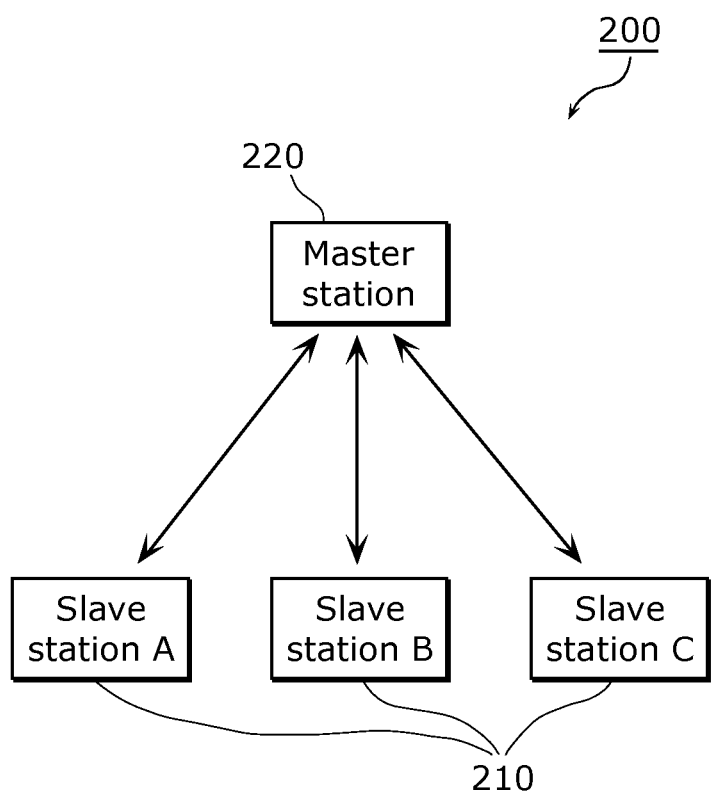
FIG. 5 shows a configuration of a communication system according to Embodiment 2.

FIG. 4 shows an outline of a communication system 200 according to Embodiment 2. FIG. 5 shows a configuration of the communication system 200 according to Embodiment 2.

The communication system 200 includes a plurality of slave stations 210 and a master station 220.

The master station 220 is an example of the communication device, and controls the slave stations 210 via the communication network. For example, the master station 220 is a non-portable electrical device which collects electric power data from each of the slave stations 210 and controls operation of each of the slave stations 210 based on the collected electric power data.

Each of the slave stations 210 is an example of the communication device, and is controlled by the master station 220 via the communication network. Each of the slave station 210 is, for example, a non-portable electrical device which (i) supplies electric power (a solar photovoltaic power generator, a storage battery, or a fuel cell, for example) or (ii) consumes electric power (a TV, a refrigerator, a washing machine, an air conditioner, an air cleaner, or a fan, for example).

The following describes a case where the slave stations 210 include three slave stations: a slave station A; a slave station B; and a slave station C. It is to be noted that the slave stations 210 are not necessarily three, and may be four or more.

Figures 6, 7:
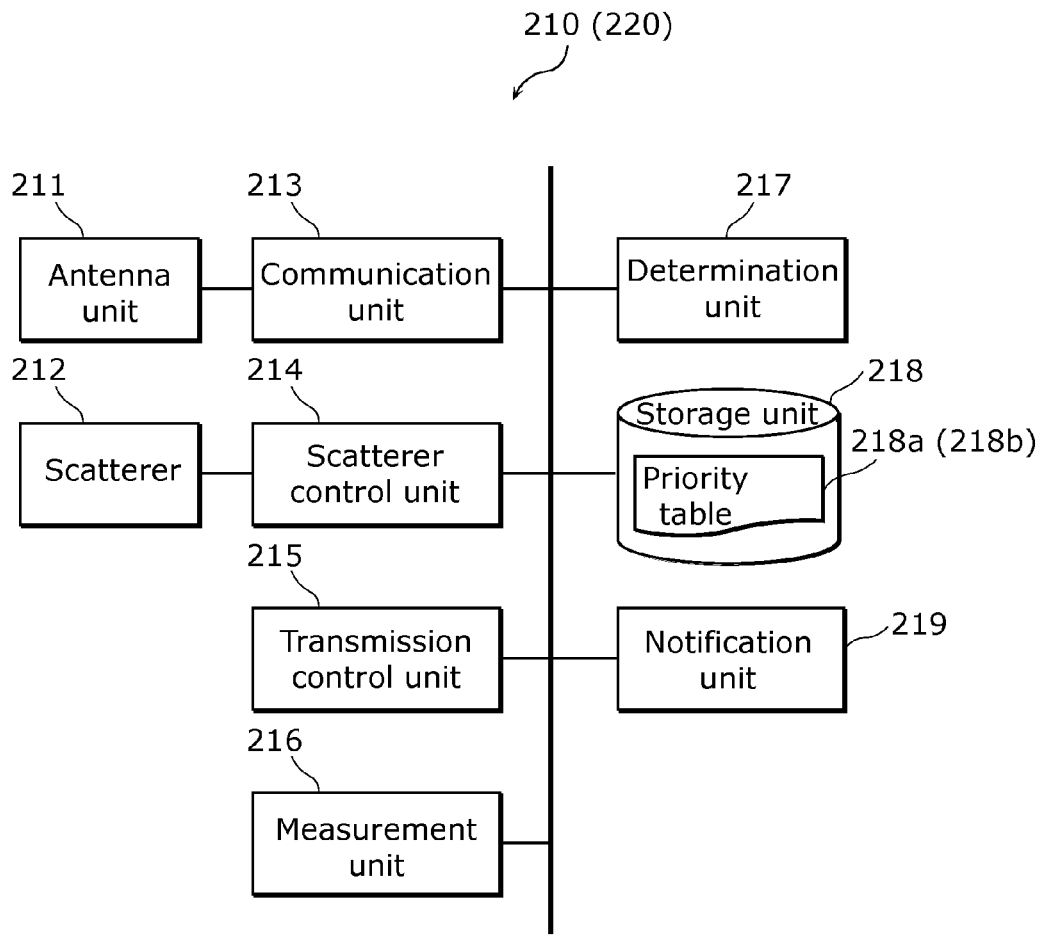
FIG. 6 is a block diagram showing a configuration of a slave station according to Embodiment 2.
FIG. 7 shows an example of a priority table according to Embodiment 2.

FIG. 6 is a block diagram showing a configuration of one of the slave stations 210 according to Embodiment 2. That is, FIG. 6 is a block diagram showing a configuration of each of the slave stations A through C. The one of the slave stations 210 includes an antenna unit 211, a scatterer 212, a communication unit 213, a scatterer control unit 214, a transmission control unit 215, a measurement unit 216, a determination unit 217, a storage unit 218, and a notification unit 219.

The antenna unit 211 transmits and receives electric waves, in the same manner as described in the antenna unit 111 according to Embodiment 1.

The scatterer 212 reflects the electric waves in the communication band. When the one of the slave stations 210 is an air conditioner or an air cleaner, the scatterer 212 may be a louver for adjusting a direction of wind. Alternatively, when the one of the slave stations 210 is a fan, the scatterer 212 may be a fan blade. In this manner, by using a member for implementing a function of the one of the slave stations 210 as the scatterer 212, it possible to reduce the number of components of the slave station 210.

The communication unit 213 wirelessly communicates with the master station 220 or the rest of the slave stations 210. For example, the communication unit 213 transmits electric power data to the master station 220 and receives control data from the master station 220.

Furthermore, the communication unit 213 transmits a predetermined request packet to each of the rest of the slave stations 210. The predetermined request packet is a packet for causing each of the rest of the slave stations 210 to transmit a response packet.

When communication fails between the communication unit 213 and the master station 220, the scatterer control unit 214 changes the state of the scatterer 212. For example, when the one of the slave stations 210 is an air conditioner or an air cleaner, the scatterer control unit 214 changes the angle of the louver (scatterer 212). Furthermore, for example, when the one of the slave stations 210 is a fan, the scatterer control unit 214 changes the rotating speed of the fan blade (scatterer 212).

When communication fails with the master station 220 even after changing the state of the scatterer 212 by the scatterer control unit 214, the transmission control unit 215 causes the communication unit 213 to transmit, to one of the rest of the slave stations 210, a control request for changing the state of the scatterer 212 of the one of the rest of the slave stations 210. In the present embodiment, the rest of the slave stations 210 include two or more slave stations. Therefore, the transmission control unit 215 causes the communication unit 213 to transmit, to the rest of the slave stations 210, the control request according to the priority level determined by the determination unit 217. Specifically, the transmission control unit 215 transmits the control requests in a descending order of priority levels of the rest of the slave stations 210, via the communication unit 213.

The measurement unit 216 measures reception intensity of a response packet transmitted from each of the rest of the slave stations 210 upon receipt of the predetermined request packet. That is, the measurement unit 216 measures the reception intensity of the response packet received from each of the rest of the slave stations 210. The response packet is a packet for the predetermined request packet.

The reception intensity indicates intensity of a signal which the one of the slave station 210 receives from one of the rest of the slave stations 210. Specifically, the reception intensity is obtained by measuring the electric power of the electric waves received by the antenna unit 211 (received electric power). For example, the reception intensity may be a value indicating the measured received electric power itself, or may be a value indicating the received electric power corrected according to the transmission power of one of the rest of the slave stations 210. Alternatively, for example, the reception intensity may be a value corrected according to a noise amount of the received electric waves.

The determination unit 217 determines priorities of the rest of the slave stations 210 so that the priority level increases as the reception intensity of the response packet measured by the measurement unit 216 increases.

The storage unit 218 is a non-volatile recording medium for example, and stores a priority table 218a in which the priority level determined by the determination unit is recorded. Details on the priority table 218a are provided later with reference to FIG. 7.

When communication fails with the master station 220 even after transmitting the control request to all of the rest of the slave stations 210, the notification unit 219 notifies the user of information indicating that communication fails with the master station 220 (hereinafter referred to as "communication failure information").

Specifically, the notification unit 219 notifies the user of the communication failure information by, for example, lighting an LED lamp. Alternatively, for example, the notification unit 219 may notify the user of the communication failure information by outputting a sound. Alternatively, for example, the notification unit 219 may notify the user of the communication failure information by displaying the communication failure information on a display. Alternatively, for example, the notification unit 219 may notify the user of the communication failure information through an external device by transmitting the communication failure information to the external device (display device, for example).

In this way, the notification unit 219 can notify the user that communication fails with the master station 220 even after changing the state of the scatterer of the one of the slave stations and the state of the scatterers of the rest of the slave stations 210. Accordingly, it is possible for the user to make the one of the slave stations 210 to recover from a state in which communication fails with the master station 220, by changing the installment position of the one of the slave stations 210, for example.

FIG. 7 shows an example of a priority table 218a according to Embodiment 2. Specifically, FIG. 7 shows an example of the priority table 218a stored in the storage unit 218 of the slave station A included in the slave stations 210.

The priority level in association with each of the slave stations 210 is recorded in the priority table 218a. In FIG. 7, a value of the priority level decreases as the priority level increases. The reception intensity in association with each of the slave stations 210 is also recorded in the priority table 218a.

In the present embodiment, the transmission control unit 215 of the slave station A transmits a control request via the communication unit 213, in a descending order of the priority levels of the rest of the slave stations 210 (slave station B, then slave station C) by referring to the priority table 218a.

The priority level of the slave station A, that is the one of the slave stations, is also recorded in the priority table 218a in FIG. 7. However, the priority level of the one of the slave stations is not necessarily recorded. Furthermore, the reception intensity is not necessarily recorded in the priority table 218a.

Next, various operations of the communication device 200 as configured above are described. The following describes the operation performed by the slave station A, when the slave station A from among the slave stations 210 communicates with the master station 220. Here, the slave station A corresponds to the communication device, the master station corresponds to the first communication partner device, and the slave stations B and C correspond to the second communication partner devices.

Figure 8:
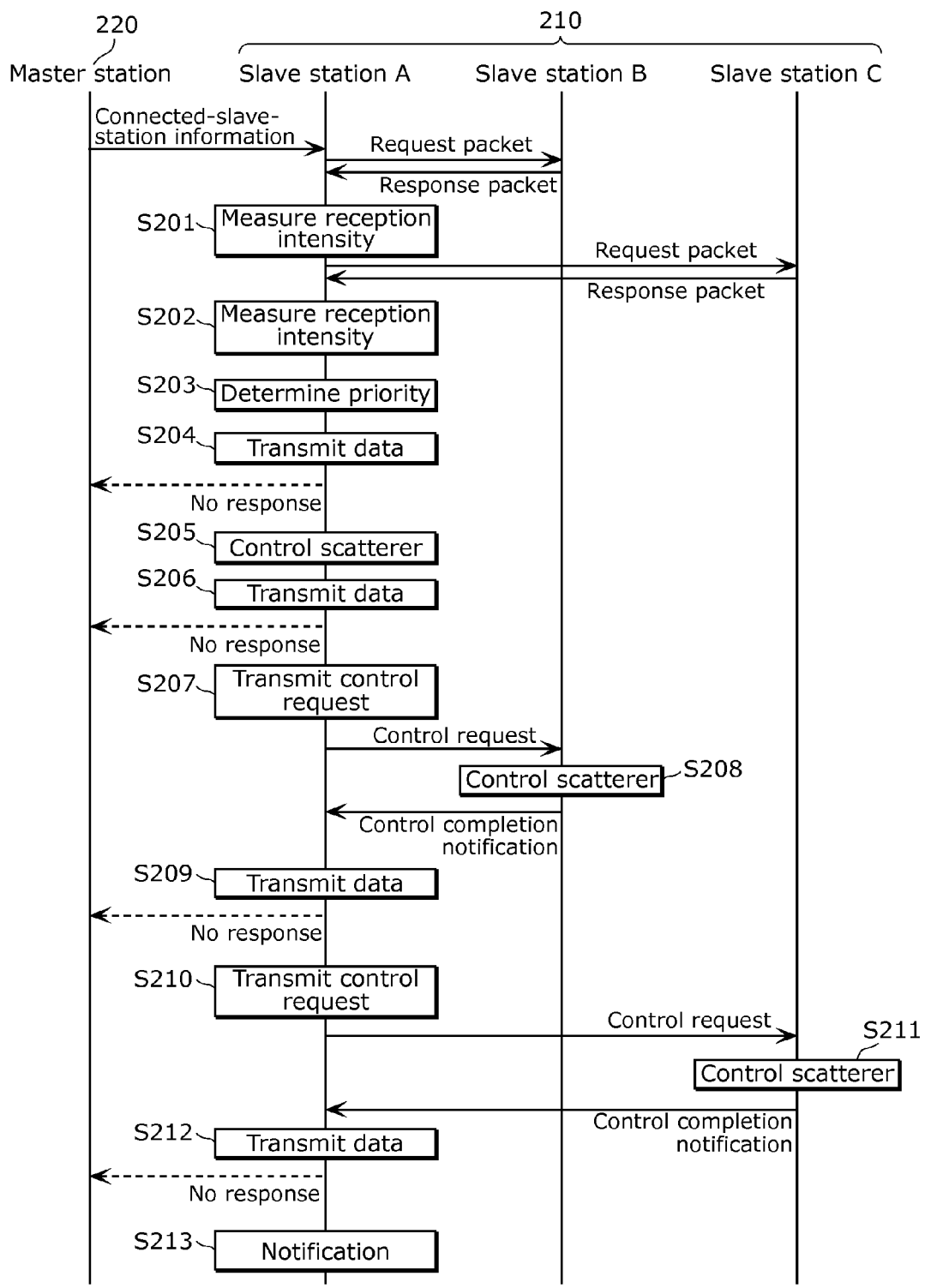
FIG. 8 is a sequence diagram of the communication system according to Embodiment 2.

FIG. 8 is a sequence diagram of the communication system 200 according to Embodiment 2.

The master station 220 transmits, to the slave station A, information related to the slave stations 210 connected to the master station 220 (connected-slave-station information). In the present embodiment, information related to at least the slave stations B and C is transmitted. It is to be noted that the information related to the slave stations 210 includes, for example, a communication address for communicating with the slave stations 210.

Then, the slave station A transmits a predetermined request packet to the slave station B, and the slave station B transmits a response packet for the predetermined request packet to the slave station A. Here, the measurement unit 216 of the slave station A measures the reception intensity of the response packet from the slave station B (S201).

Then, the slave station A transmits a predetermined request packet to the slave station C, and the slave station C transmits a response packet for the predetermined request packet to the slave station A. Here, the measurement unit 216 of the slave station A measures the reception intensity of the response packet from the slave station C (S202).

The determination unit 217 of the slave station A determines the priority level of the slave stations B and C based on the reception intensity of the response packet from the slave station B and the reception intensity of the response packet from the slave station C (S203). Here, since the reception intensity of the slave station B is greater than the reception intensity of the slave station C as shown in FIG. 7, the determination unit 217 determines the priorities of the slave stations B and C so that the priority level of the slave station B is higher than the priority level of the slave station C. Specifically, the determination unit 217 determines the priority level of the slave station B as "2" and the priority level of the slave station C as "3". In this manner, the determination unit 217 determines the priorities of the rest of the slave stations 210 (slave station B and slave station C) prior to communicating with the master station 220, and records the determined priority levels into the priority table 218a.

Next, the communication unit 213 of the slave station A transmits data to the master station 220 (S204). That is, the communication unit 213 wirelessly communicates with the master station 220. Here, when a response to the data transmission in S204 is not received from the master station 220, the scatterer control unit 214 of the slave station A changes the state of the scatterer 212 of the one of the slave station (slave station A) (S205).

Next, the communication unit 213 of the slave station A transmits data to the master station 220 (S206). Here, when a response to the data transmission in S206 is not received from the master station 220, the transmission control unit 215 of the slave station A causes the communication unit 213 to transmit control requests to one of the rest of the slave stations 210 (slave station B or slave station C), according to the priority level recorded in the priority table 218a. Specifically, the transmission control unit 215 causes the communication unit 213 to transmit the control request to the slave station B that is assigned with the higher priority level from among the slave stations B and C (S207).

The scatterer control unit 214 of the slave station B changes the state of the scatterer 212 of the slave station B according to the control request received by the slave station A (S208). Then, the communication unit 213 of the slave station B transmits a control completion notification to the slave station A.

The communication unit 213 of the slave station A transmits data to the master station 220 (S209). Here, when a response to the data transmission in S209 is not received from the master station 220, the transmission control unit 215 of the slave station A causes the communication unit 213 to transmit a control request to the slave station C, which is assigned with the second highest priority level following the slave station B to which the control request is already transmitted (S210).

The scatterer control unit 214 of the slave station C changes the state of the scatterer 212 of the slave station C according to the control request received from the slave station A (S211). Then, the communication unit 213 of the slave station C transmits a control completion notification to the slave station A.

The communication unit 213 of the slave station A transmits data to the master station 220 (S212). Here, when a response to the data transmission in S212 is not received from the master station 220, the notification unit 219 of the slave station A notifies the user of information indicating that communication fails with the master station 220 (S213).

Next, the processing operation performed by the slave station A is described with reference to FIG. 9.

Figure 9:
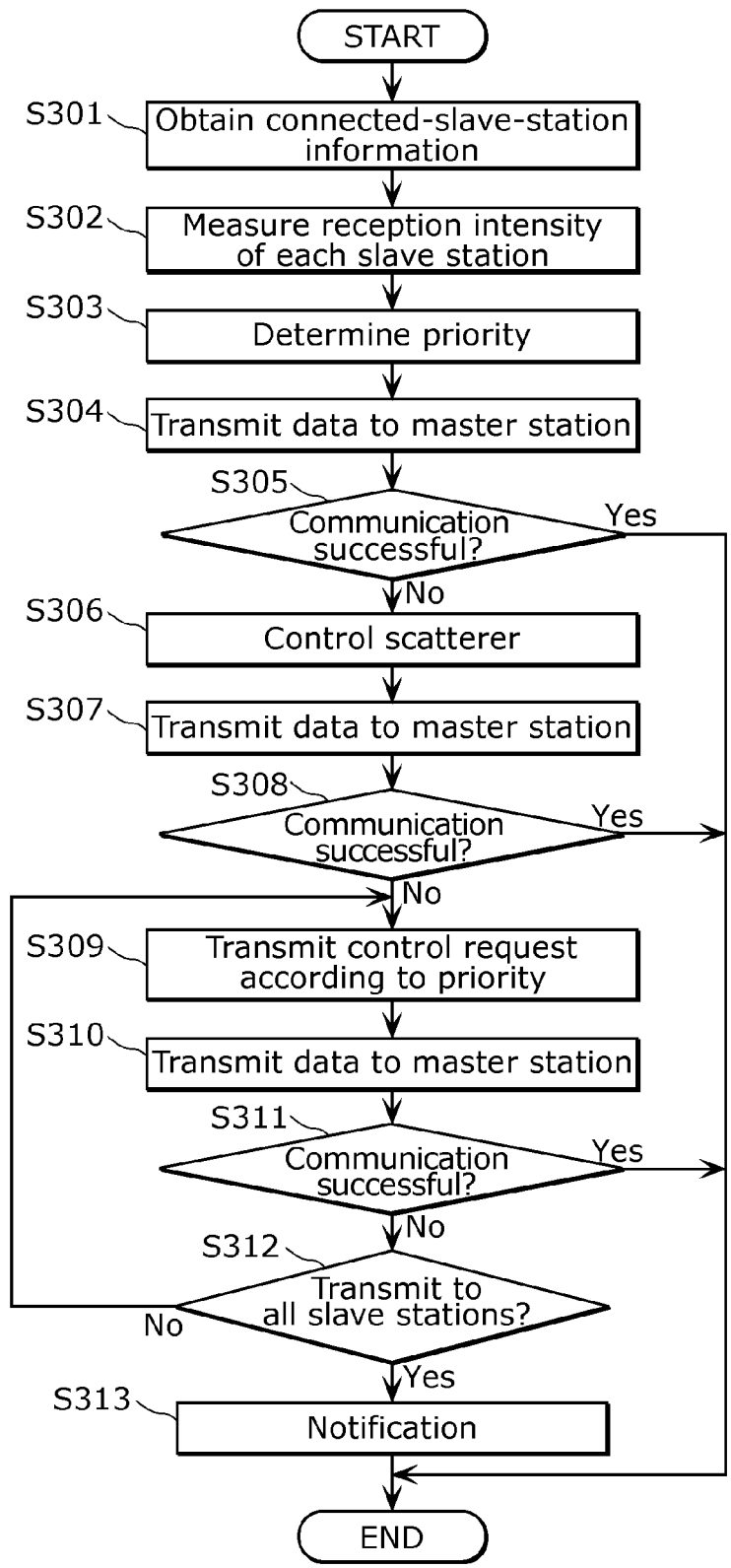
FIG. 9 is a flowchart showing a processing operation performed by the slave station according to Embodiment 2.

FIG. 9 is a flowchart showing a processing operation performed by the slave station according to Embodiment 2.

First, the communication unit 213 obtains the connected-slave-station information from the master station 220 (S301). Then, the measurement unit 216 measures the reception intensity of the response packet from each of the rest of the slave stations 210 (S302).

Then, the determination unit 217 determines the priority level of each of the rest of the slave stations 210 based on the measured reception intensity (S303). The determination unit 217 records the determined priority level of each of the rest of the slave stations 210 into the priority table 218a.

Next, the communication unit 213 transmits data to the master station 220 (S304). The communication unit 213 determines whether or not communication succeeds with the master station 220, based on whether or not response to the data transmission is received (S305). Here, when communication succeeds with the master station 220 (Yes in S305), the processing is completed.

Meanwhile, when communication fails with the master station 220 (No in S305), the scatterer control unit 214 changes the state of the scatterer 212 (S306). Then, the communication unit 213 transmits data to the master station 220 (S307).

The communication unit 213 determines whether or not communication succeeds with the master station 220, based on whether or not response to the data transmission is received (S308). Here, when communication succeeds with the master station 220 (Yes in S308), the processing is completed.

Meanwhile, when communication fails with the master station 220 (No in S308), the transmission control unit 215 causes the communication unit 213 to transmit a control request to one of the rest of the slave stations 210 to which the control request has not been transmitted, according to the priority level recorded in the priority table 218a (S309). Then, the communication unit 213 transmits data to the master station 220 (S310).

The communication unit 213 determines whether or not communication succeeds with the master station 220, based on whether or not response to the data transmission is received (S311). Here, when communication succeeds with the master station 220 (Yes in S311), the processing is completed. Meanwhile, when communication fails with the master station 220 (No in S311), the communication unit 213 determines whether or not the control requests are transmitted to all of the rest of the slave stations 210 (S312).

Here, when the control request is not transmitted to any one of the rest of the slave stations 210 (No in S312), the processing returns to S309. Meanwhile, when the control request is transmitted to all of the rest of the slave stations 210 (Yes in S312), the notification unit 219 notifies the user of the information indicating that communication fails with the master station 220 (S313).

As described above, with the one of the slave stations 210 according to the present embodiment, when a rest of the slave station 210 includes a plurality of slave stations 210, the priority levels of the rest of the slave stations 210 can be determined so that the priority level increases as the reception intensity of the response packet increases. In other words, the one of the slave stations 210 can preferentially transmit a control request to one of the rest of the slave stations 210 which has a large influence on the propagation state of the electric waves near the one of the slave stations 210. Accordingly, it is possible to make communication between the one of the slave stations 210 and the master station 220 successful more efficiently than by changing the state of the scatterers of the rest of the slave stations 210 at random.

Furthermore, with the one of the slave stations 210 according to the present embodiment, a control request can be transmitted to the rest of the slave stations according to the preliminarily determined priority levels. That is, the one of the slave stations 210 is not required to transmit the request packets to the rest of the slave stations 210 to determine the priority levels every time communication fails with the master station 220. Accordingly, when communication fails with the master station 220, the one of the slave stations 210 can transmit control requests to the rest of the slave stations 210 in a shorter time period. As a result, the one of the slave stations 210 can recover from a state in which communication fails with the master station 220.

In the present embodiment, the one of the slave stations 210 (i) determines the priority level prior to communicating with the master station 220 and (ii) records the determined priority level into the priority table 218a. However, the priority level is not necessarily determined preliminarily. That is, the one of the slave stations 210 may determine the priority level after it is determined that communication fails with the master station 220. Specifically, in FIGS. 8, S201 to S204 may be performed after S206. In this case, the one of the slave stations 210 may not include the storage unit 218 for storing the priority table 218a.

Furthermore, the one of the slave stations 210 includes the notification unit 219 in the present embodiment. However, the one of the slave stations 210 may not necessarily include the notification unit 219.

[Modification 1 of Embodiment 2]

Next, description on Modification 1 of Embodiment 2 is provided. In the present modification, the state of the scatterer 212 of each of the slave stations 210 is further recorded in the priority table 218a.

FIG. 10 shows an example of the priority table 218a according to Modification 1 of Embodiment 2. Specifically, FIG. 10 shows an example of the priority table 218a of the slave station A.

In the priority table 218a, not only the priority level but also the state of the scatterer of each of the slave stations are recorded. That is, (i) the state of the scatterer 212 of the one of the slave stations 210 (slave station A) and (ii) the state of the scatterer 212 of each of the rest of the slave stations 210 (slave station B and slave station C) are recorded in the priority table 218a. It is sufficient that the state of the scatterer of each of the slave stations A through C, which is obtained when communication succeeds between the slave station A and the master station 220, is recorded as the state of the scatterer, for example.

When communication fails with the master station 220, the scatterer control unit 214 changes the state of the scatterer 212 to the state recorded in the priority table 218a.

When communication fails with the master station 220 even after changing the state of the scatterer 212 by the scatterer control unit 214, the transmission control unit 215 of the one of the slave stations causes the communication unit 213 to transmit, to one of the rest of the slave stations 210, a control request for changing the state of the scatterer 212 of the one of the rest of the one of the slave stations 210 to the state recorded in the priority table 218a.

As described above, with the one of the slave stations 210 according to the present modification, the state of the scatterer of the one of the slave stations 210 and the state of the scatterers of the rest of the slave stations 210 can be changed to the state of the scatterer recorded in the priority table 218a. Accordingly, by recording the state of the scatterer obtained when communication succeeds between the one of the slave stations 210 and the master station 220 into the priority table 218a, it is possible to make communication between the one of the slave stations 210 and the master station 220 successful promptly.

[Modification 2 of Embodiment 2]

Next, description on Modification 2 of Embodiment 2 is provided. The present modification is different from Embodiment 2 mainly in that the priority level recorded in the priority table 218a is updated every time the control request is transmitted.

Figure 11:
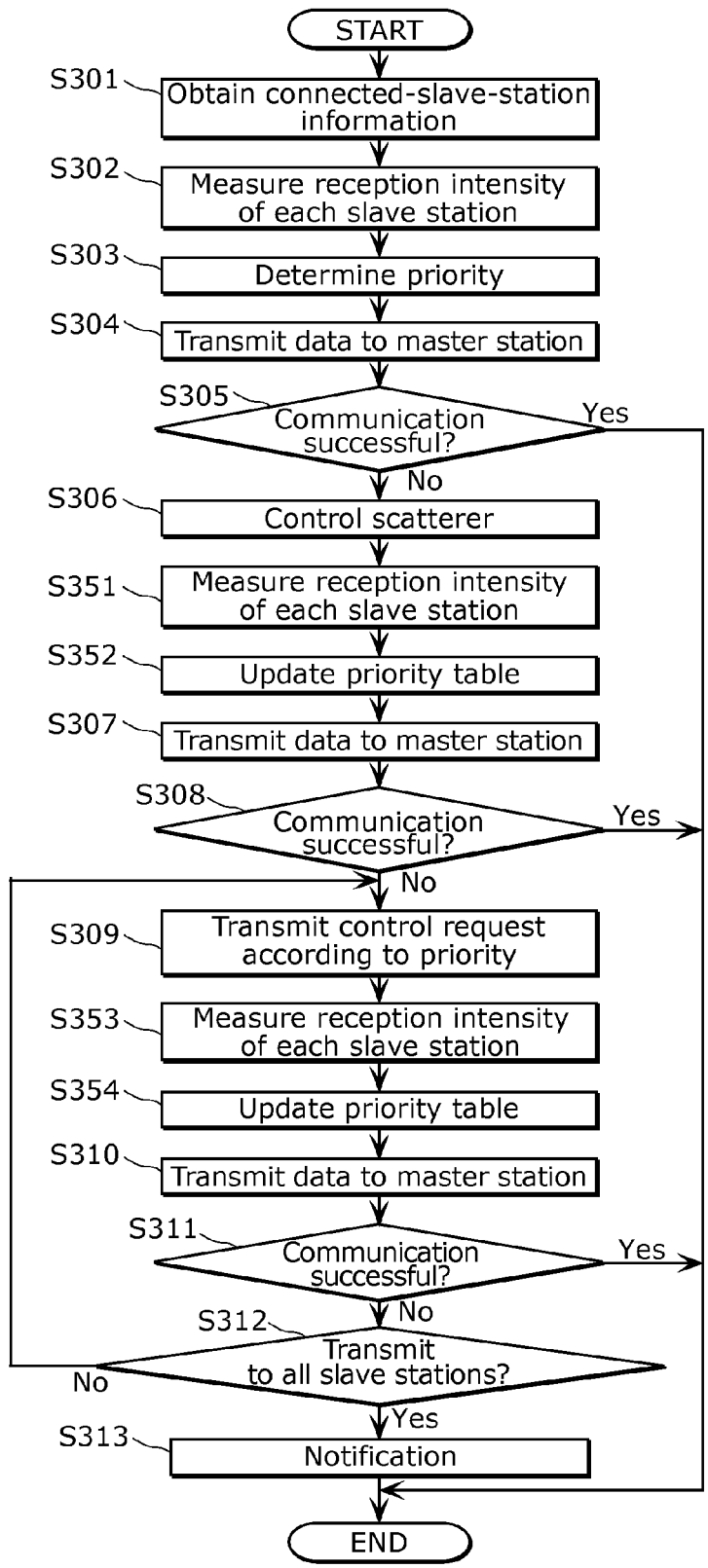
FIG. 11 is a flowchart showing a processing operation performed by a slave station according to Modification 2 of Embodiment 2.

FIG. 11 is a flowchart showing a processing operation performed by the one of the slave stations 210 according to Modification 2 of Embodiment 2. It is to be noted that processing which is similar to those in FIG. 9 is assigned with the same numerals as in FIG. 9 and the description is omitted.

In the same manner as in Embodiment 1, the measurement unit 216 measures the reception intensity of the response packet for the request packet transmitted to each of the rest of the slave stations 210, after S301 through S306 are performed (S351). That is, the measurement unit 216 measures the reception intensity in response to the change of the scatterer 212 of the one of the slave stations. Then, the determination unit 217 updates the priority levels of the rest of the slave stations 210 recorded in the priority table 218a according to the measured reception intensity (S352).

Then, the measurement unit 216 measures the reception intensity of the response packet for the request packet transmitted to each of the rest of the slave stations 210, after S307 through 5309 are performed (S353). That is, the measurement unit 216 measures the reception intensity in response to the change of the state of the scatterer 212 of the rest of the slave stations 210. Then, the determination unit 217 updates the priority levels of the rest of the slave stations 210 recorded in the priority table 218a, according to the measured reception intensity (S354). Then, S310 through S313 are performed.

As described above, with the one of the slave stations 210 according to the present modification, the reception intensity can be measured and the priority level can be updated, in response to the change in the state of the scatterer. Accordingly, the control request can be transmitted to the rest of the slave stations 210 according to the current reception intensity. That is, it is possible to preferentially transmit the control request to one of the rest of the slave stations 210 which has a large influence on the propagation state of the electric waves near the one of the slave stations 210. As a result, it is possible to make communication successful between the one of the slave stations 210 and the master station 220 more efficiently.

[Modification 3 of Embodiment 2]

Next, description on Modification 3 of Embodiment 2 is provided.

The reception intensity of the response packet depends on the magnitude of the transmission power used when the response packet is transmitted. However, the magnitude of the transmission power has small influence on the propagation state of the electric waves near the communication device. Accordingly, it is preferable that the influence of the transmission power is lowered when the priority level is determined according to the reception intensity of the response packet.

Therefore, in the present modification, the reception intensity of the response packet is corrected according to the transmission power used when each of the rest of the slave stations 210 transmits the response packet.

The following describes a processing unit which performs an operation different from that in Embodiment 2.

The communication unit 213 receives, from each of the rest of the slave stations 210, information indicating the transmission power used when each of the rest of the slave stations 210 transmits the response packet. It is sufficient that the information indicating the transmission power is included in the response packet, for example. Alternatively, the information indicating the transmission power may be included in data different from the response packet.

The measurement unit 216 corrects the reception intensity of the response packet according to the transmission power indicated by the information received by the communication unit 213. It is sufficient that the measurement unit 216 corrects the reception intensity by dividing the reception intensity of the response packet with a ratio of the transmission power to a preliminarily-defined reference transmission power, for example. Alternatively, for example, the measurement unit 216 may add a value obtained by subtracting the transmission power from the reference transmission power, to the reception intensity of the response packet.

As described above, with the one of the slave stations 210 according to the present modification, the reception intensity of the response packet is corrected according to the transmission power used when each of the rest of the slave stations other transmits the response packet. This lowers the influence of the transmission power on determination of the priority level. Therefore, it is possible to determine the priority level so that a priority level of the one of the rest of the slave stations 210 increases as the influence of the one of the rest of the slave stations 210 on the propagation state of the electric waves near the communication device increases.

[Embodiment 3]

Next, description on Embodiment 3 is provided.

In Embodiment 2, when communication between the one of the slave stations 210 and the master station 220 fails, the one of the slave stations 210 controls the state of the scatterer 212 of the one of the slave stations 210 or the state of the scatterers 212 of the rest of the slave stations 210. However, in the present embodiment, the master station 220 controls the state of the scatterer 212 of the master station 220 or the state of the scatterers 212 of the rest of the slave stations 210. That is, in the present embodiment, the master station corresponds to the communication device, the slave station A corresponds to the first communication partner device, and the slave stations B and C correspond to the second communication partner devices.

It is to be noted that illustration and description on the configuration of the communication system and the master station according to the present embodiment is omitted, since they are similar to those according to Embodiment 2 shown in FIG. 5 and FIG. 6.

FIG. 12 shows an example of a priority table 218a according to Embodiment 3. As shown in FIG. 12, the priority levels of the slave stations 210 connected to the master station 220 are recorded in the priority table 218b.

Next, various operations of the communication system 200 according to the present embodiment are described.

Figure 13:
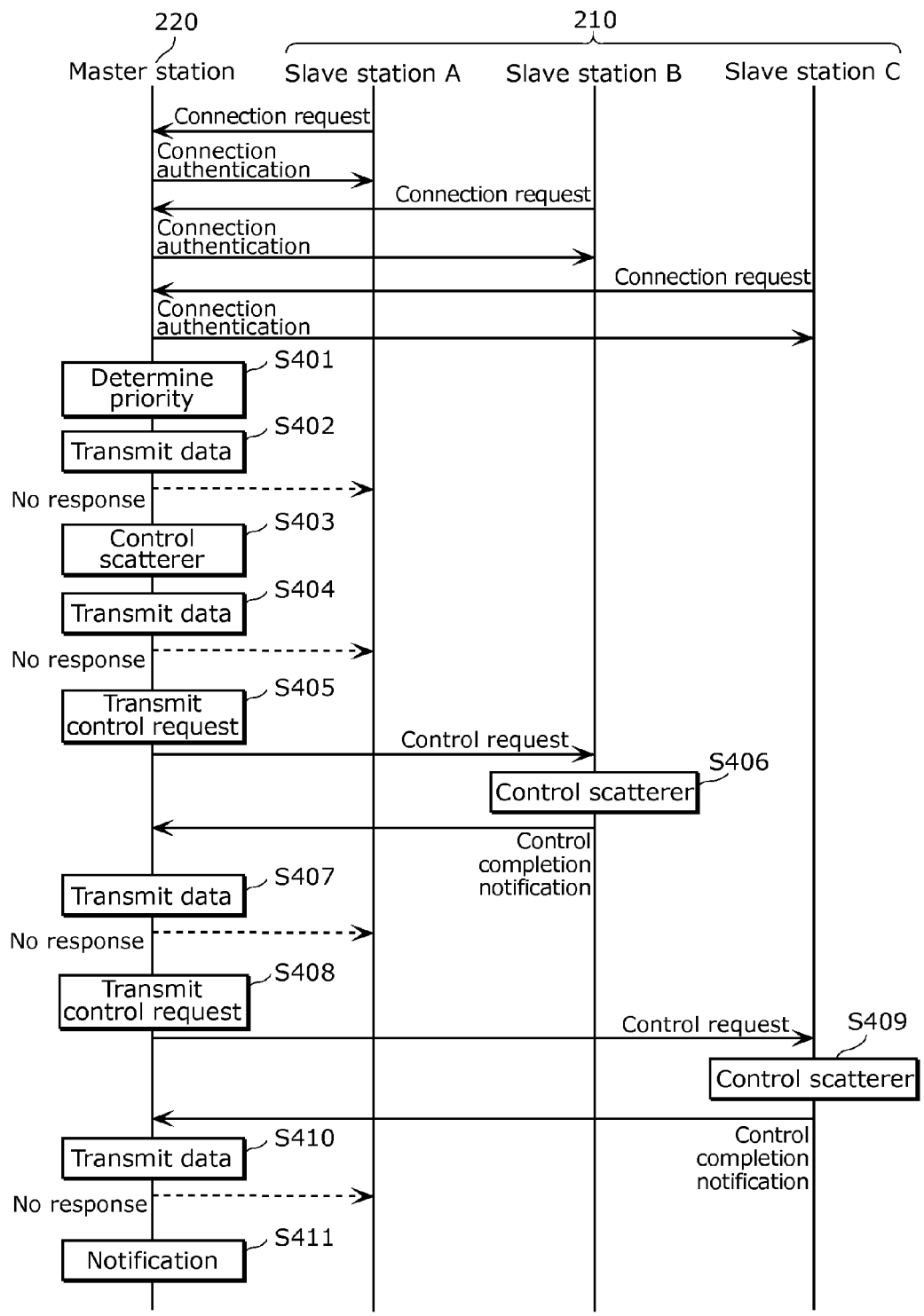
FIG. 13 is a sequence diagram of a communication system according to Embodiment 3.

FIG. 13 is a sequence diagram of the communication system 200 according to Embodiment 3. In FIG. 13, the description is provided with focusing on the operation performed by the master station 220 when communication fails between the master station 220 and the slave station A.

The master station 220 receives a connection request from each of the slave stations (slave stations A through C), and transmits to each of the slave stations connection authentication indicating that the connection is authenticated. It is to be noted that the connection request transmitted by each of the slave stations includes information indicating the reception intensity in the one of the slave stations 210.

The determination unit 217 of the master station 220 determines the priority level of each of the slave stations 210 based on the reception intensity obtained by the connection request (S401). Here, as shown in FIG. 12, the determination unit 217 determines the priority level of each of the slave stations 210, and records the determined priority level into the priority table 218b.

Next, the communication unit 213 of the master station 220 transmits data to the slave station A (S402). Here, when a response to the data transmission in S402 is not received from the slave station A, the scatterer control unit 214 of the master station 220 changes the state of the scatterer 212 of the master station (master station 220) (S403).

Then, the communication unit 213 of the master station 220 transmits data to the slave station A (S404). Here, when a response to the data transmission is not received from the slave station A, the transmission control unit 215 of the master station 220 causes the slave station B, which is assigned with the higher priority level from among the rest of the slave stations (slave station B and slave station C) in the priority table 218b shown in FIG. 12, to transmit a control request for changing the state of the scatterer 212 of the slave station B to the communication unit 213 (S405).

The scatterer control unit 214 of the slave station B changes the state of the scatterer 212 of the slave station B according to the control request received from the master station 220 (S406). Then, the communication unit 213 of the slave station B transmits a control completion notification to the master station 220.

The communication unit 213 of the master station 220 transmits data to the slave station A (S407). Here, when a response to the data transmission in S407 is not received, the transmission control unit 215 of the master station 220 causes the slave station C, which is assigned with the second highest priority level following the slave station B to which the control request is already transmitted in the priority table 218b shown in FIG. 12, to transmit the control request for changing the state of the scatterer 212 of the slave station C to the communication unit 213 (S408).

The scatterer control unit 214 of the slave station C changes the state of the scatterer 212 of the slave station C according to the control request received from the master station 220 (S409). Then, the communication unit 213 of the slave station C transmits a control completion notification to the master station 220.

The communication unit 213 of the master station 220 transmits data to the slave station A (S410). Here, when a response to the data transmission in S410 is not received from the slave station A, the notification unit 219 of the master station 220 notifies the user of information indicating that communication fails with the slave station A (S411).

Next, the processing operation performed by the master station 220 is described with reference to FIG. 14.

Figure 14:
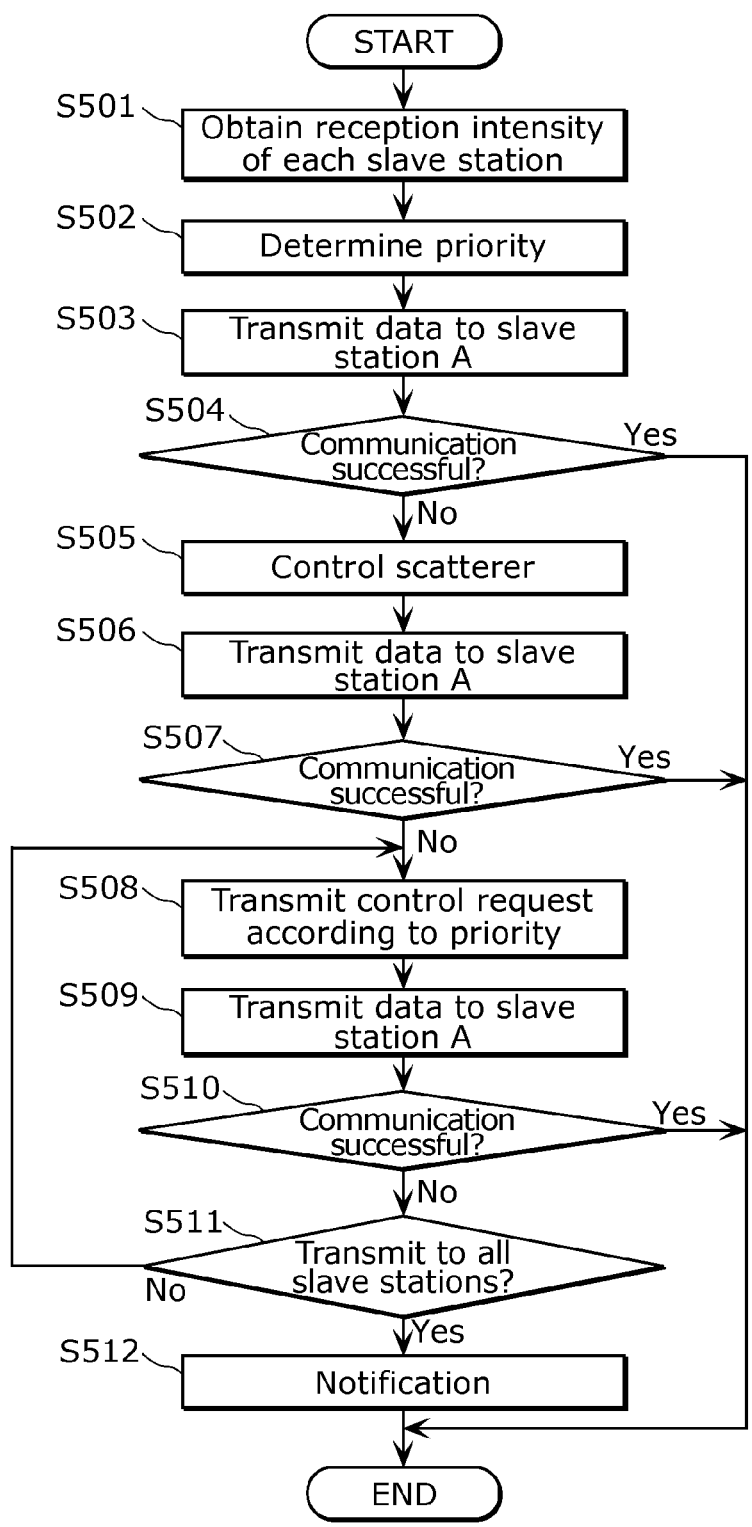
FIG. 14 is a flowchart showing a processing operation performed by a master station according to Embodiment 3.

FIG. 14 is a flowchart showing a processing operation performed by the slave station 220 according to Embodiment 3.

First, the communication unit 213 obtains reception intensity from each of the slave stations 210 (S501). The determination unit 217 determines a priority level of each of the slave stations 210 based on the obtained reception intensity (S502). The determination unit 217 records the determined priority level of each of the slave stations 210 into the priority table 218b.

Next, the communication unit 213 transmits data to one of the slave stations 210 (here, slave station A) (S503). The communication unit 213 determines whether or not communication succeeds with the slave station A, based on whether or not response to the data transmission is received (S504). Here, when communication succeeds with slave station A (Yes in S504), the processing is completed.

Meanwhile, when communication fails with the slave station A (No in S504), the scatterer control unit 214 changes the state of the scatterer 212 (S505). Then, the communication unit 213 transmits data to the slave station A (A506).

The communication unit 213 determines whether or not communication succeeds with the slave station A, based on whether or not response to the data transmission is received (S507). Here, when communication succeeds with the slave station A (Yes in S507), the processing is completed.

Meanwhile, when communication fails with the slave station A (No in S507), the transmission control unit 215 causes the communication unit 213 to transmit the control request for changing the state of the scatterer 212 of one of the slave stations 210 to one of the rest of the slave stations 210 (S508). Then, the communication unit 213 transmits data to the slave station A (S509).

The communication unit 213 determines whether or not communication succeeds with the slave station A, based on whether or not a response to the data transmission is received (S510). Here, when communication succeeds with the slave station A (Yes in S510), the processing is completed. Meanwhile, when communication fails with the slave station A (No in S510), the communication unit 213 determines whether or not the control request is transmitted to all of the rest of the slave stations 210 (S511).

Here, when the control request is not transmitted to any one of the rest of the slave stations 210 (No in S511), the processing returns to S508. Meanwhile, when the control request is transmitted to all of the rest of the slave stations 210 (Yes in S511), the notification unit 219 notifies the user of the information indicating that communication fails with the slave station A (S512).

As described above, with the master station 220 according to the present embodiment, the same advantageous effect provided by the one of the slave stations 210 according to Embodiment 2 above can be provided.

[Embodiment 4]

Next, description on Embodiment 4 is provided.

Embodiment 4 is different from Embodiment 1 mainly in that the communication device is not required to transmit a control request to the second communication partner device.

Figure 15:
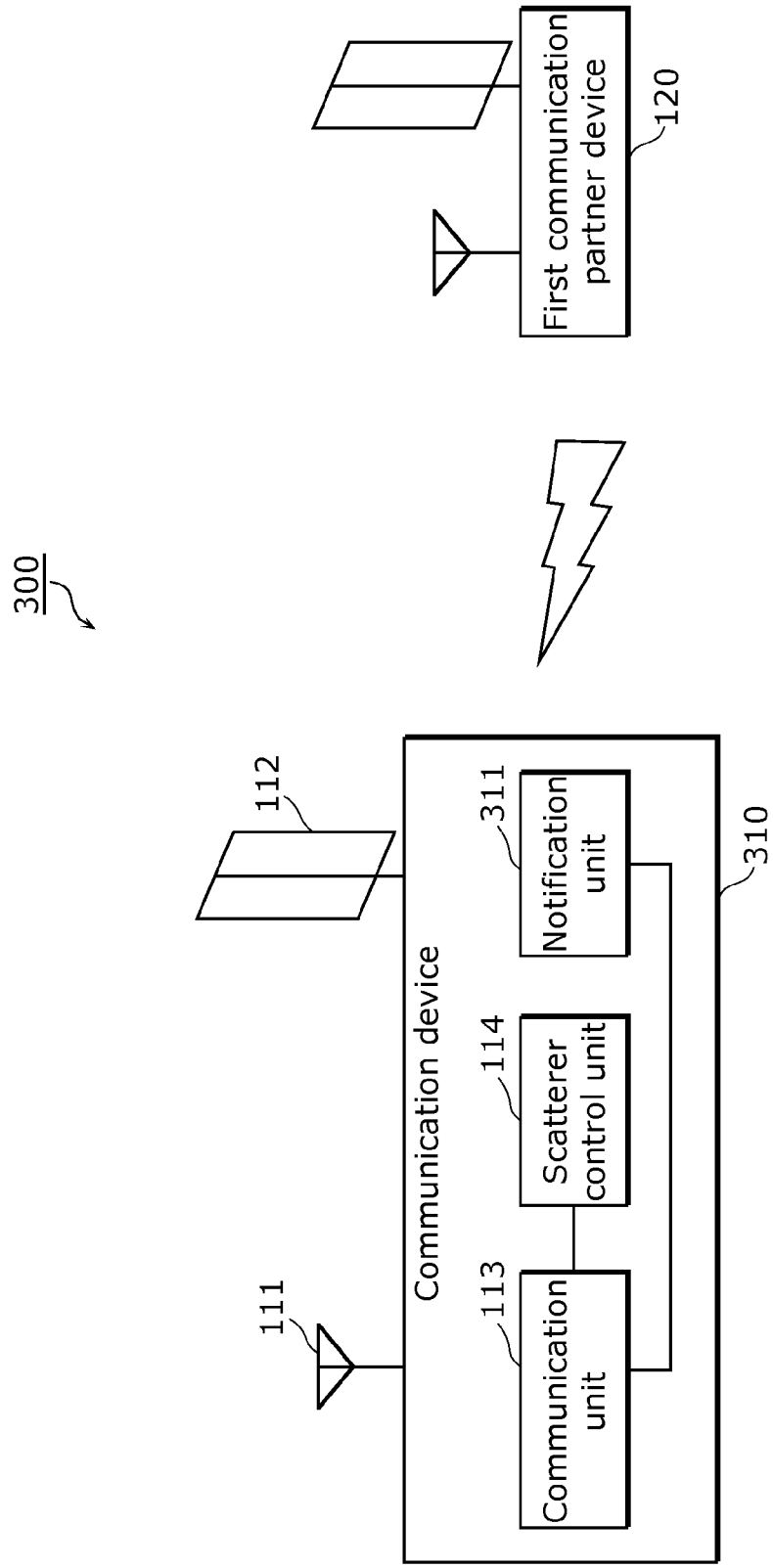
FIG. 15 shows a configuration of a communication system according to Embodiment 4.

FIG. 15 shows a configuration of a communication system 300 according to Embodiment 4. In FIG. 15, constituents which are similar to those in FIG. 1 are assigned with the same numerals as in FIG. 1 and the description is omitted. The communication system 300 includes a communication device 310 and a first communication partner device 120.

The communication device 310 wirelessly communicates with the first communication partner device 120 using electric waves. As shown in FIG. 15, the communication device 310 includes an antenna unit 111, a scatterer 112, a communication unit 113, a scatterer control unit 114, and a notification unit 311.

When communication fails with the first communication partner device 120 even after changing the state of the scatterer 112 by the scatterer control unit 114, the notification unit 311 notifies the user of information indicating that communication fails with the first communication partner device 120 (communication failure information).

Specifically, the notification unit 311 notifies the user of the communication failure information by, for example, lighting an LED lamp. Alternatively, for example, the notification unit 311 may notify the user of the communication failure information by outputting a sound. Alternatively, for example, the notification unit 311 may notify the user of the communication failure information by displaying the communication failure information on a display. Alternatively, for example, the notification unit 311 may notify the user of the communication failure information through an external device by transmitting the communication failure information to the external device (display device, for example).

Next, various operations of the communication device 310 as configured above are described.

Figure 16:
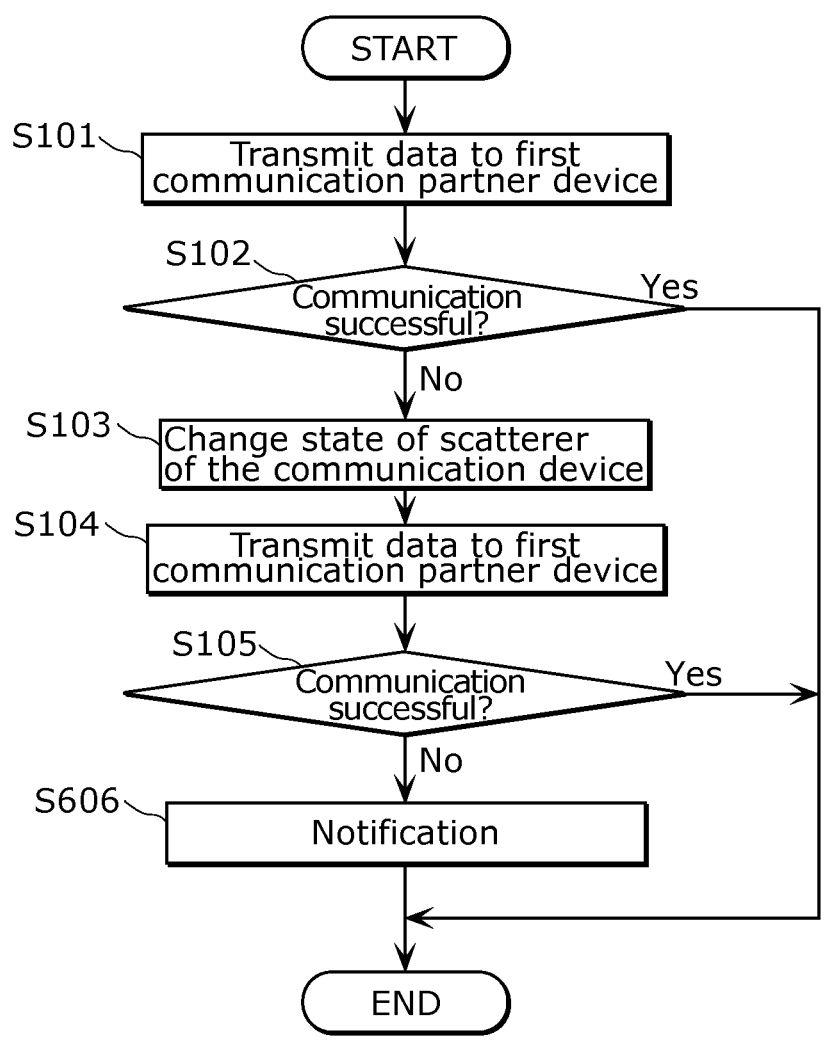
FIG. 16 is a flowchart showing a processing operation performed by a communication device according to Embodiment 4.

FIG. 16 is a flowchart showing a processing operation performed by the communication device 310 according to Embodiment 4. It is to be noted that, in FIG. 16, processing which is similar to that in FIG. 3 are assigned with the same numeral as in FIG. 3 and the description is omitted.

When it is determined that communication fails with the first communication partner device 120 in S105 (No in S105), the notification unit 311 notifies the user of the communication failure information (S606), and processing is completed.

As described above, with the communication device 310 according to the present embodiment, when communication fails between the communication device 310 and the first communication partner device 120, it is possible to make communication successful with the first communication partner device 120 again, by changing the state of the scatterer 112 of the communication device 310. In other words, even when communication fails between the communication device and a communication partner device due to decrease in reception intensity of electric waves to the point of being null, it is possible to make communication successful again without moving the communication device, by changing the state of the scatterer of the communication device 310.

Furthermore, with the communication device 310 according to the present embodiment, it is possible to notify the user that communication fails with the first communication partner device 120 even after changing the state of the scatterer 112 of the communication device 310. Accordingly, it is possible for the user to recover from a state in which communication fails between the communication device 310 and the first communication partner device 120, by changing the installment position of the communication device 310, for example.

The communication device 310 includes the notification unit 311 in the present embodiment. However, the communication device 310 does not necessarily include the notification unit 311. That is, the communication device 310 does not necessarily execute the processing of S606.

Although the communication system and the communication device according to an aspect of the present invention have been described above based on the embodiments, the present invention is not limited to these embodiments. Other forms in which various modifications apparent to those skilled in the art are applied to the embodiment, or forms structured by combining constituent elements of different embodiments are included within the scope of the present invention, unless such changes and modifications depart from the scope of the present invention.

For example, a part or all of the constituents included in the communication device 110, the communication device 310, the slave station 210, or the master station 220 according to the above embodiments may be configured with a single System Large Scale Integration (System LSI). For example, the communication unit 113 and the scatterer control unit 114 of the communication device 310 may be configured with a single system LSI.

The system LSI is a super-multifunctional LSI in which constituent units are integrated on a single chip, and specifically is a computer system including a microprocessor, a read-only memory (ROM), and a random-access memory (RAM). The RAM stores a computer program. The microprocessor operates according to the computer program so that the system LSI can perform its function.

The integrated circuit described as a system LSI may be referred to as an IC, an LSI, a super LSI, or an ultra LSI depending on the degree of integration. The method of forming integrated circuitry is not limited to use of an LSI. Dedicated circuitry or a general-purpose processor may be used instead of an LSI. Also applicable is a field programmable gate array (FPGA), which allows post-manufacture programming, or a reconfigurable processor LSI, which allows post-manufacture reconfiguration of connection and setting of circuit cells therein.

Furthermore, in the event that an advance in or derivation from semiconductor technology brings about an integrated circuitry technology whereby an LSI is replaced, functional blocks may be obviously integrated using such new technology. Application of biotechnology or the like is possible.

Furthermore, another possible aspect of the present invention is a communication method including the characteristic processing units in the communication device as a stepwise process. Furthermore, another possible aspect of the present invention is a computer program which causes a computer to execute the characteristic stepwise process of the communication method. Furthermore, another possible aspect of the present invention is a non-transitory computer-readable recording medium on which such a computer program is recorded.

In the exemplary embodiments, each of the constituent elements may be implemented as a piece of dedicated hardware or implemented by executing a software program appropriate for each of the constituent elements. The constituent elements may be implemented by a program execution unit such as a CPU or a processor which reads and executes a software program recorded on a recording medium such as a hard disk or a semiconductor memory. The communication devices in the above-described embodiments are implemented by executing a software program below.

That is, the program causes a computer to execute: wirelessly communicating with the communication partner device via an antenna unit through which electric waves are transmitted and received; and changing, when communication fails between the communication device and the communication partner device in the wirelessly communicating, a state of a scatterer which reflects the electric waves.

INDUSTRIAL APPLICABILITY

The communication device according to an aspect of the present invention is useful as, for example, a communication device constituting a communication system for controlling a plurality of devices which supply or consume electric power.

REFERENCE SIGNS LIST 100, 200, 300 Communication system
110, 310 Communication device
111, 211 Antenna unit
112, 212 Scatterer
113, 213 Communication unit
114, 214 Scatterer control unit
115, 215 Transmission control unit
120 First communication partner device
130 Second communication partner device
210 Slave station
210 Measurement unit
217 Determination unit
218 Storage unit
218a, 218b Priority table
219, 311 Notification unit
220 Master station

The invention claimed is:
1. A communication device comprising:
an antenna unit through which electric waves are transmitted and received;
a scatterer which reflects the electric waves;
a communication unit configured to wirelessly communicate with a first communication partner device via the antenna unit;
a scatterer control unit configured to change a state of the scatterer when communication fails between the communication unit and the first communication partner device; and
a transmission control unit configured to, when communication fails between the communication unit and the first communication partner device even after changing the state of the scatterer by the scatterer control unit, cause the communication unit to transmit, to a second communication partner device, a control request for changing a state of a scatterer of the second communication partner device.

2. The communication device according to claim 1,
wherein, when the second communication partner device includes two or more second communication partner devices,
the communication unit is configured to transmit a predetermined request packet to each of the second communication partner devices,
the communication device further comprises:
a measurement unit configured to measure reception intensity of a response packet transmitted from each of the second communication partner devices upon reception of the predetermined request packet; and
a determination unit configured to determine a priority level of each of the second communication partner devices, the priority level increasing as the reception intensity of the response packet increasing, and
when communication fails between the communication unit and the first communication partner device even after changing the state of the scatterer, the transmission control unit is configured to cause the communication unit to transmit the control request to the second communication partner device in order of the priority level determined by the determination unit.

3. The communication device according to claim 2,
wherein the determination unit is configured to determine the priority level of each of the second communication partner devices prior to communicating with the first communication partner device,
the communication device further comprises
a storage unit configured to store a priority table in which the priority level determined by the determination unit is recorded, and
when communication fails between the communication unit and the first communication partner device even after changing the state of the scatterer, the transmission control unit is configured to cause the communication unit to transmit the control request to the second communication partner device in order of the priority level recorded in the priority table.

4. The communication device according to claim 3,
wherein the measurement unit is configured to measure the reception intensity in response to the change in (i) the state of the scatterer of the communication device or (ii) the state of the scatterer of the second communication partner device, and
the determination unit is configured to update the priority levels of the second communication partner devices recorded in the priority table, according to the measured reception intensity.

5. The communication device according to claim 3,
wherein (i) the state of the scatterer of the communication device and (ii) the state of the scatterer of each of the second communication partner devices are further recorded in the priority table,
when communication fails between the communication unit and the first communication partner device, the scatterer control unit is configured to change the state of the scatterer into the state recorded in the priority table, and
when communication fails between the communication unit and the first communication partner device even after changing the state of the scatterer by the scatterer control unit, the transmission control unit is configured to cause the communication unit to transmit, to the second communication partner device, a control request for changing a state of a scatterer of the second communication partner device into the state recorded in the priority table.

6. The communication device according to claim 2, wherein the communication unit is configured to receive, from each of the second communication partner devices, information indicating transmission power used by the second communication partner device in transmitting the response packet, and the measurement unit is configured to correct the reception intensity of the response packet according to the transmission power indicated by the received information.

7. The communication device according to claim 1, wherein the communication device further comprises a notification unit configured to, when communication fails between the communication unit and the first communication partner device even after transmitting the control request to all of the second communication partner devices, notify a user of information indicating that communication fails between the communication unit and the first communication partner device.

8. The communication device according to claim 1, wherein the communication device is a non-portable electric apparatus.

9. The communication device according to claim 1, wherein the communication unit is configured to determine that communication fails between the communication unit and the first communication partner device, (i) when a response is not received from the first communication partner device for a certain period of time after transmitting data to the first communication partner device or (ii) when the reception intensity obtained when receiving data from the first communication partner device is equal to or smaller than a predetermined threshold.

10. The communication device according to claim 1, wherein the scatterer is a louver of an air conditioner, a louver of an air cleaner, or a fan blade.

11. The communication device according to claim 1, wherein the first communication partner device is a master station which controls slave stations via a communication network, and the communication device and the second communication partner device are the slave stations.

12. The communication device according to claim 1, wherein the communication device is a master station which controls slave stations via a communication network, and the first communication partner device and the second communication partner device are the slave stations.

13. The communication device according to claim 1, further comprising a notification unit configured to, when communication fails between the communication unit and the first communication partner device even after changing the state of the scatterer by the scatterer control unit, notify a user of information indicating that communication fails between the communication unit and the first communication partner device.

14. A communication method of a communication device for wirelessly communicating with a first communication partner device, the method comprising:

wirelessly communicating with the first communication partner device via an antenna unit through which electric waves are transmitted and received;

changing, when communication fails between the communication device and the first communication partner device in the wirelessly communicating, a state of a scatterer which reflects the electric waves, the scatterer being included in the communication device; and when communication fails between the communication device and the first communication partner device even after changing the state of the scatterer by the scatterer control unit, transmitting, to a second communication partner device, a control request for changing a state of a scatterer of the second communication partner device.

15. A communication device comprising:

an antenna unit through which electric waves are transmitted and received;

a scatterer which reflects the electric waves;

a communication unit configured to wirelessly communicate with a first communication partner device via the antenna unit;

a scatterer control unit configured to change a state of the scatterer when communication fails between the communication unit and the first communication partner device; and wherein the scatterer is a louver of an air conditioner, a louver of an air cleaner, or a fan blade.

* * * * *